(12) United States Patent
Givens

(10) Patent No.: US 7,207,589 B2
(45) Date of Patent: Apr. 24, 2007

(54) VEHICLE AND TRAILER MOUNTED HITCH ALIGNMENT APPARATUS

(76) Inventor: Ricky C. Givens, 1205 Rouse Rd., Bolton, MS (US) 39041

( * ) Notice: Subject to any disclaimer, the term of this patent is extended or adjusted under 35 U.S.C. 154(b) by 86 days.

(21) Appl. No.: 11/065,616

(22) Filed: Feb. 24, 2005

(65) Prior Publication Data

US 2005/0194761 A1    Sep. 8, 2005

Related U.S. Application Data

(60) Provisional application No. 60/549,885, filed on Mar. 4, 2004.

(51) Int. Cl.
  *B60D 1/36* (2006.01)
  *B60D 1/40* (2006.01)
(52) U.S. Cl. .................................. 280/477
(58) Field of Classification Search ................. 280/477
  See application file for complete search history.

(56) References Cited

U.S. PATENT DOCUMENTS

| | | | | |
|---|---|---|---|---|
| 2,815,732 A | * | 12/1957 | Majors | ............. 116/28 R |
| 3,774,149 A | * | 11/1973 | Bennett | ............. 340/431 |
| 3,818,599 A | * | 6/1974 | Tague | ............. 33/264 |
| 4,621,432 A | | 11/1986 | Law | |
| 5,269,554 A | * | 12/1993 | Law et al. | ............. 280/477 |
| 5,669,621 A | | 9/1997 | Lockwood | |
| 6,139,041 A | * | 10/2000 | Murphy | ............. 280/477 |
| 6,168,181 B1 | | 1/2001 | Gadd | |
| 6,273,448 B1 | | 8/2001 | Cross | |
| 6,386,572 B1 | | 5/2002 | Cofer | |
| 6,585,281 B1 | * | 7/2003 | Voorting | ............. 280/477 |
| 6,916,109 B2 | * | 7/2005 | Julicher | ............. 362/487 |
| 2003/0178809 A1 | * | 9/2003 | Anderson | ............. 280/477 |
| 2003/0209880 A1 | * | 11/2003 | Koestler | ............. 280/477 |
| 2004/0124606 A1 | * | 7/2004 | Wilcox | ............. 280/477 |
| 2004/0251659 A1 | * | 12/2004 | Amerson | ............. 280/477 |

* cited by examiner

*Primary Examiner*—Lesley D. Morris
*Assistant Examiner*—Marlon Arce-Diaz

(57) ABSTRACT

A hitch alignment apparatus is provided for mounting on a motor vehicle and a trailer for facilitating the hitching of a motor vehicle to a trailer. The vehicle and trailer mounted hitch alignment apparatus includes a motor-vehicle-mounted trailer alignment unit for attachment to a rear portion of the motor vehicle and includes a trailer-mounted motor vehicle alignment unit for attachment to the front portion of the trailer. When the motor-vehicle-mounted trailer alignment unit and the trailer-mounted motor vehicle alignment unit are in proper registration, the vehicle-mounted trailer ball and the trailer-mounted ball receiver are in alignment and registration to facilitate the interconnection therebetween. Each of the motor-vehicle-mounted trailer alignment unit and the trailer-mounted motor vehicle alignment unit includes respective adjustable-length riser portions that facilitate efficient adjustment of and use of the alignment apparatus.

12 Claims, 3 Drawing Sheets

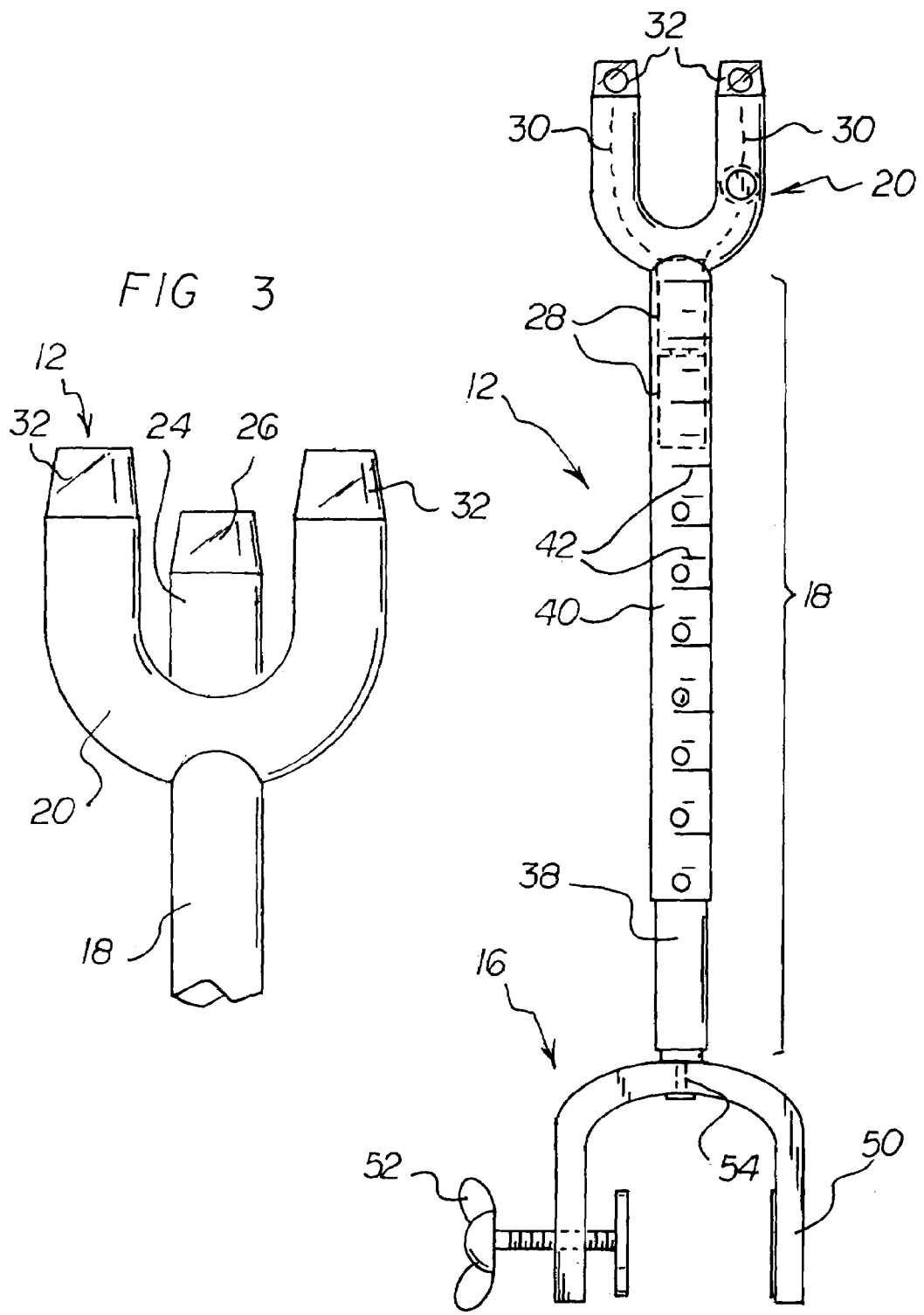

VEHICLE AND TRAILER MOUNTED HITCH ALIGNMENT APPARATUS

CROSS-REFERENCE TO RELATED APPLICATION

This application claims priority based upon my Provisional Application Ser. No. 60/549,885, filed Mar. 4, 2004.

FIELD OF THE INVENTION

The present invention relates generally to devices for aligning a vehicle-mounted trailer ball with a trailer-mounted ball receiver and, more particularly, to a device which includes one alignment portion mounted on the vehicle and another alignment portion mounted on the trailer.

DESCRIPTION OF THE PRIOR ART

The need for aligning a motor vehicle with a trailer, so that a vehicle-mounted trailer ball can be properly aligned with a trailer-mounted ball receiver is well known. Moreover, often the driver of the vehicle needs to be able to align the vehicle with the trailer without the assistance of another person. In this respect, throughout the years, a number of innovations have been developed relating to allowing a driver of a motor vehicle to align the vehicle-mounted trailer ball with a trailer-mounted ball receiver without the assistance of another person, and the following U.S. patents are representative of some of those innovations: U.S. Pat. Nos. 4,621,432, 5,669,621, 6,168,181, 6,273,448, and 6,386,572.

More specifically, U.S. Pat. No. 4,621,432 discloses a trailer hook-up guide system in which one member vibrates when proper alignment is achieved. The driver is expected to observe the vibration. For a number of reasons, the observation of a vibrating element may be difficult for the driver of a motor vehicle to see. It may be dark with insufficient light. There may be rain or snow occurring. The driver may have to glance away from the alignment device at the moment when vibration occurs. For these reasons, it would be desirable if an alignment device for a vehicle and trailer were provided which does not depend upon proper alignment by observing a vibrating element.

U.S. Pat. No. 5,669,621 discloses a vehicle alignment device which includes one alignment unit fixed to the motor vehicle with magnets and includes another alignment unit, which is a pivoting alignment unit, attached to the trailer. It is noted that some vehicle components are made from non-ferrous materials and, as a result, will not accept attachment of magnet based elements. In this respect, it would be desirable if an alignment device for a vehicle and trailer were provided which does not require magnet based attachment means. Also, it would be desirable if an alignment device for a vehicle and trailer were provided which does not require a pivoting alignment unit.

U.S. Pat. No. 6,168,181 discloses a trailer alignment backing aid for motor vehicles. One element of the alignment device fits onto the vehicle-mounted trailer ball. By having the element of the alignment device fitting onto the vehicle-mounted trailer ball, the trailer-mounted ball receiver cannot be placed directly over the vehicle-mounted trailer ball when the alignment device is in proper position. In this respect, it would be desirable if an alignment device for a vehicle and trailer were provided which does not require an alignment element to be fitted onto a vehicle-mounted trailer ball.

U.S. Pat. No. 6,273,448 discloses a trailer hitch and tongue alignment system which also includes one element of the alignment system that fits onto the vehicle-mounted trailer ball. For the reason stated above, having an alignment element mounted on the vehicle-mounted trailer ball is undesirable.

U.S. Pat. No. 6,386,572 discloses a trailer hitch apparatus that includes alignment means which require one alignment element on a vehicle and positioned at a substantial distance from and directly over the vehicle-mounted trailer ball and requires another alignment element on the trailer which has an electrically powered source of illumination for directing light to the other alignment element. Having a required electrically powered source of illumination is undesirable in that an electrically powered source of illumination can fail. In this respect, it would be desirable if an alignment device for a vehicle and trailer were provided which does not require an electrically powered source of illumination. However, if desired, an optional electrically powered source of illumination could be provided in a desired alignment device for a vehicle and trailer.

Still other features would be desirable in a vehicle and trailer mounted hitch alignment apparatus. For example, it would be desirable for an alignment device for a vehicle and trailer to have a first alignment device which can be removably clamped onto the vehicle and have a second alignment device which can be removably clamped onto the trailer. In this respect, the first and second clamping devices can be removed from the respective vehicle and trailer, and the respective first and second alignment devices and be placed in storage until needed.

In addition, different vehicles have different vertical heights, and different trailers have different vertical heights. In this respect, it would be desirable if an alignment device for a vehicle and trailer were provided which has alignment elements whose vertical heights can be adjusted.

As mentioned above, it may be a desirable option for an alignment device for a vehicle and trailer to have a source of illumination. More specifically, it would be desirable if an alignment device for a vehicle and trailer had a first source of illumination for a first alignment device and had a second source of illumination for a second alignment device. Then, when proper alignment of the vehicle and the trailer takes place, the first source of illumination and the second source of illumination are themselves in proper alignment. That is, the proper alignment of the first source of illumination and the second source of illumination is indicative of the proper alignment of the vehicle and the trailer.

Thus, while the foregoing body of prior art indicates it to be well known to use alignment devices for aligning a vehicle with a trailer, the prior art described above does not teach or suggest a vehicle and trailer mounted hitch alignment apparatus which has the following combination of desirable features: (1) does not depend upon proper alignment by observing a vibrating element; (2) does not require magnet-based attachment means; (3) does not require a pivoting alignment unit; (4) does not require an alignment element to be fitted onto a vehicle-mounted trailer ball; (5) does not require an electrically powered source of illumination; (6) has a first alignment device which can be removably clamped onto the vehicle and has a second alignment device which can be removably clamped onto the trailer; (7) has alignment elements whose vertical heights can be adjusted; and (8) provides that the proper alignment of a first source of illumination and a second source of illumination is indicative of the proper alignment of the vehicle and the trailer. The foregoing desired characteristics are provided by the unique vehicle and trailer mounted hitch alignment apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a hitch alignment apparatus for mounting on a motor vehicle and a trailer for facilitating the hitching of the motor vehicle to the trailer. The vehicle and trailer mounted hitch alignment apparatus includes a motor-vehicle-mounted trailer alignment unit for attachment to a rear portion of the motor vehicle and includes a trailer-mounted motor vehicle alignment unit for attachment to the front portion of the trailer. When the motor-vehicle-mounted trailer alignment unit and the trailer-mounted motor vehicle alignment unit are in proper registration, the vehicle-mounted trailer ball and the trailer-mounted ball receiver are in alignment and registration to facilitate the interconnection therebetween.

The motor-vehicle-mounted trailer alignment unit includes a first clamp assembly for clamping onto the rear portion of the motor vehicle. A first adjustable-length riser portion is connected to the first clamp assembly, and a first alignment member is connected to the top of the first adjustable-length riser portion. A first swivel connection is connected between the first adjustable-length riser portion and the first clamp assembly.

The trailer-mounted motor vehicle alignment unit includes a second clamp assembly for clamping onto the front portion of the trailer. A second adjustable-length riser portion is connected to the second clamp assembly, and a second alignment member is connected to the top of the second adjustable-length riser portion. A second swivel connection is connected between the second adjustable-length riser portion and the second clamp assembly.

Each of the first clamp assembly and the second clamp assembly includes a C-shaped fixed clamping member that is connected to a respective adjustable-length riser portion and includes a movable clamping screw assembly that is connected to the C-shaped fixed clamping member.

The first alignment member is formed as a U-shaped alignment member has two alignment branches, and the second alignment member is formed as a single alignment member which is placed in registration between the alignment branches.

The first adjustable-length riser portion includes a first inner riser member connected to the first clamp assembly and includes a first outer riser member received on the first inner riser member.

The first outer riser member is connected to the first inner riser member in a telescopic manner. The effective length of the first adjustable-length riser portion is adjusted by extending the first outer riser member with respect to the first inner riser member. The first outer riser member is fitted to the first inner riser member by a friction fit.

The second adjustable-length riser portion includes a second inner riser member that is connected to the second clamp assembly and includes a second outer riser member received on the second inner riser member. The second outer riser member is connected to the second inner riser member in a telescopic manner. The effective length of the second adjustable-length riser portion is adjusted by extending the second outer riser member with respect to the second inner riser member. The second outer riser member is fitted to the second inner riser member by a friction fit.

The first outer riser member includes first length measurement indicia, and the second outer riser member includes second length measurement indicia.

Preferably, a first illumination assembly is housed in the motor-vehicle-mounted trailer alignment unit. The first illumination assembly includes a first set of batteries. A first set of wiring is electrically connected to the first set of batteries, and a first set of illumination devices is electrically connected to the first set of wiring.

Also, preferably, a second illumination assembly is housed in the trailer-mounted motor vehicle alignment unit. The second illumination assembly includes a second set of batteries. A second set of wiring is electrically connected to the second set of batteries, and a second illumination device is electrically connected to the second set of wiring.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle and trailer mounted hitch alignment apparatus which has all of the advantages of the prior art and none of the disadvantages.

It is another object of the present invention to provide a new and improved vehicle and trailer mounted hitch alignment apparatus which may be easily and efficiently manufactured and marketed.

It is a further object of the present invention to provide a new and improved vehicle and trailer mounted hitch alignment apparatus which is of durable and reliable construction.

An even further object of the present invention is to provide a new and improved vehicle and trailer mounted hitch alignment apparatus which is susceptible of a low cost of manufacture with regard to both materials and labor, and which accordingly is then susceptible of low prices of sale to the consuming public, thereby making such vehicle and trailer mounted hitch alignment apparatus available to the buying public.

Still yet a further object of the present invention is to provide a new and improved vehicle and trailer mounted hitch alignment apparatus which does not depend upon proper alignment by observing a vibrating element.

Still another object of the present invention is to provide a new and improved vehicle and trailer mounted hitch alignment apparatus that does not require magnet-based attachment means.

Yet another object of the present invention is to provide a new and improved vehicle and trailer mounted hitch alignment apparatus which does not require a pivoting alignment unit.

Even another object of the present invention is to provide a new and improved vehicle and trailer mounted hitch alignment apparatus that does not require an alignment element to be fitted onto a vehicle-mounted trailer ball.

Still a further object of the present invention is to provide a new and improved vehicle and trailer mounted hitch alignment apparatus which does not require an electrically powered source of illumination.

Yet another object of the present invention is to provide a new and improved vehicle and trailer mounted hitch alignment apparatus that has a first alignment device which can be removably clamped onto the vehicle and has a second alignment device which can be removably clamped onto the trailer.

Still another object of the present invention is to provide a new and improved vehicle and trailer mounted hitch alignment apparatus which has alignment elements whose vertical heights can be adjusted.

Yet another object of the present invention is to provide a new and improved vehicle and trailer mounted hitch alignment apparatus that provides that the proper alignment of a first source of illumination and a second source of illumination is indicative of the proper alignment of the vehicle and the trailer.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged front view of a top portion of the embodiment of the vehicle and trailer mounted hitch alignment apparatus of FIG. 2 taken along line 3—3 thereof, and removed from the motor vehicle.

FIG. 4 is an enlarged rear view of a portion of the embodiment of the invention shown in FIG. 1 taken along line 4—4 thereof, and removed from the motor vehicle.

DESCRIPTION OF THE PREFERRED EMBODIMENT

Figure 1:
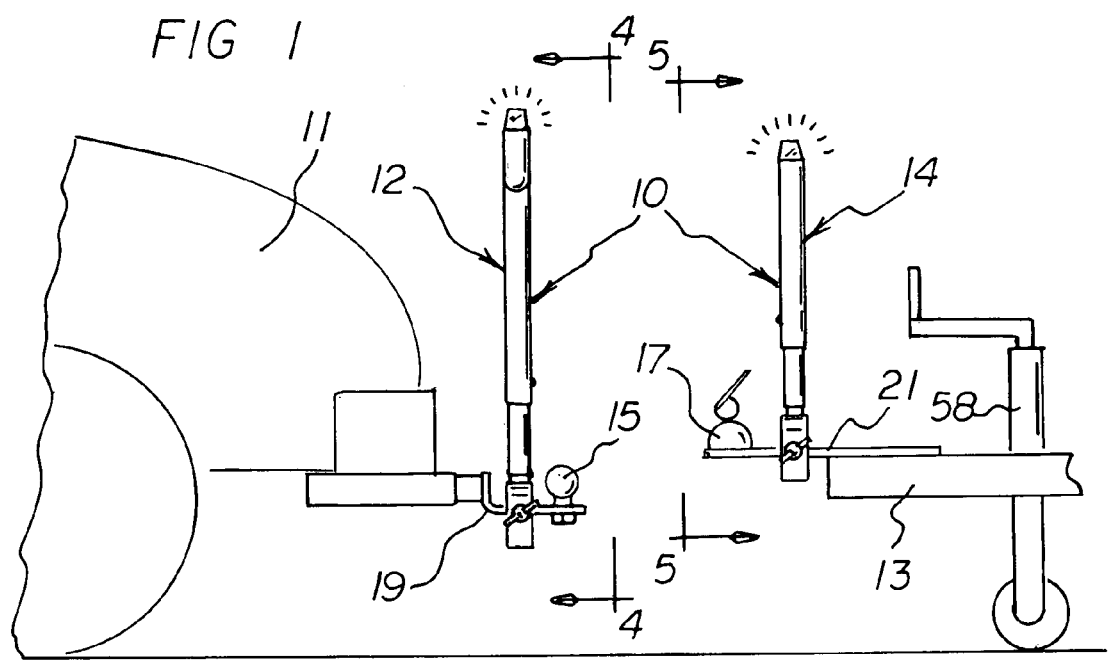
FIG. 1 is a side view showing a preferred embodiment of the vehicle and trailer mounted hitch alignment apparatus of the invention mounted on a motor vehicle and a trailer that are separated from each other.
Figure 2:
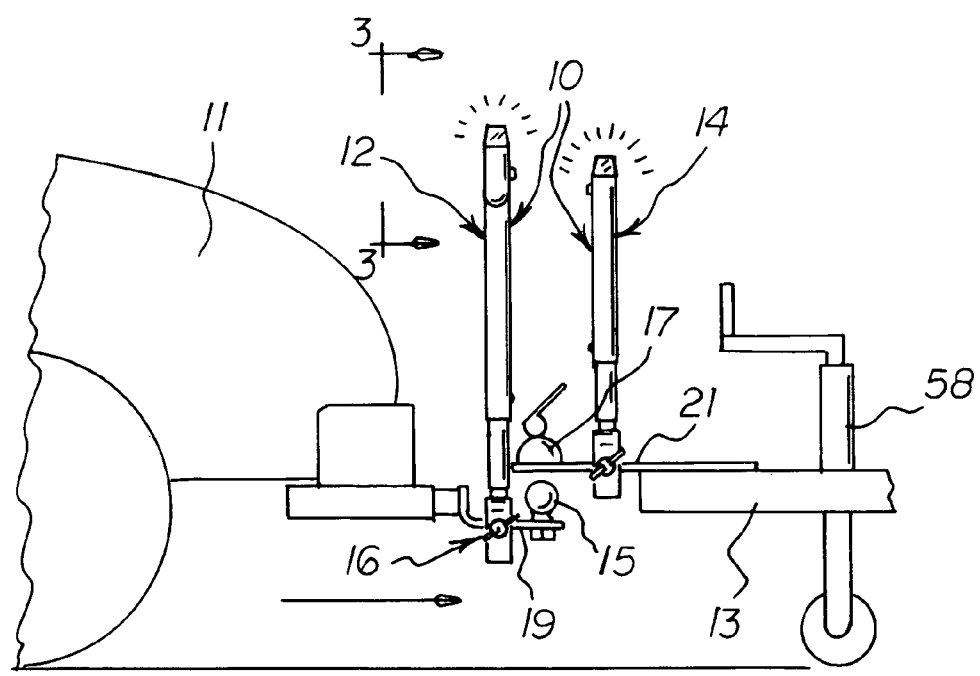
FIG. 2 is a side view of the embodiment of the vehicle and trailer mounted hitch alignment apparatus shown in FIG. 1 wherein the motor vehicle and the trailer are close together and in alignment to permit a vehicle-mounted trailer ball and a trailer-mounted ball receiver to be connected.
Figures 5, 6:
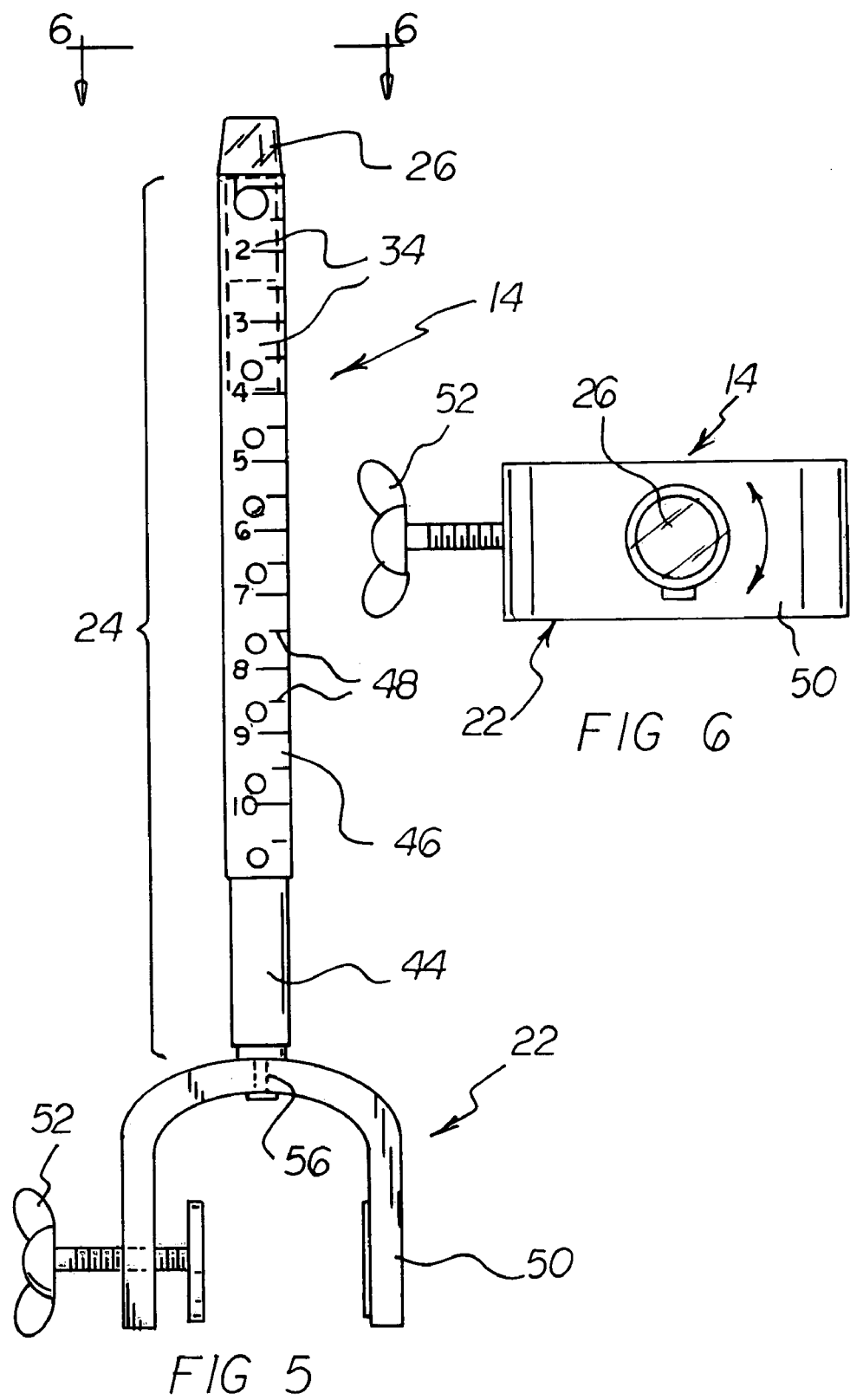
FIG. 5 is an enlarged front view of a portion of the embodiment of the invention shown in FIG. 1 taken along line 5—5 thereof, and removed from the motor vehicle.
FIG. 6 is an enlarged top view of a portion of the embodiment of the invention shown in FIG. 5, taken along line 6—6 thereof.

With reference to the drawings, a new and improved vehicle and trailer mounted hitch alignment apparatus embodying the principles and concepts of the present invention will be described.

Turning to FIGS. 1–6, there is shown a preferred embodiment of the vehicle and trailer mounted hitch alignment apparatus of the invention generally designated by reference numeral 10. In the preferred embodiment, a hitch alignment apparatus 10 is provided for mounting on a motor vehicle 11 and a trailer 13 for facilitating the hitching of a motor vehicle 11 to a trailer 13. The vehicle and trailer mounted hitch alignment apparatus 10 includes a motor-vehicle-mounted trailer alignment unit 12 for attachment to a rear portion of the motor vehicle 11 and includes a trailer-mounted motor vehicle alignment unit 14 for attachment to the front portion of the trailer 13.

The motor-vehicle-mounted trailer alignment unit 12 includes a first clamp assembly 16 for clamping onto the rear portion of the motor vehicle 11. A first adjustable-length riser portion 18 is connected to the first clamp assembly 16, and a first alignment member 20 is connected to the top of the first adjustable-length riser portion 18. A first swivel connection 54 is connected between the first adjustable-length riser portion 18 and the first clamp assembly 16.

The trailer-mounted motor vehicle alignment unit 14 includes a second clamp assembly 22 for clamping onto the front portion of the trailer 13. A second adjustable-length riser portion 24 is connected to the second clamp assembly 22, and a second alignment member 26 is connected to the top of the second adjustable-length riser portion 24. A second swivel connection 56 is connected between the second adjustable-length riser portion 24 and the second clamp assembly 22.

Each of the first clamp assembly 16 and the second clamp assembly 22 includes a C-shaped fixed clamping member 50 that is connected to a respective adjustable-length riser portion and includes a movable clamping screw assembly 52 that is connected to the C-shaped fixed clamping member 50.

The first alignment member 20 is formed as a U-shaped alignment member has two alignment branches, and the second alignment member 26 is formed as a single alignment member which is placed in registration between the alignment branches.

The first adjustable-length riser portion 18 includes a first inner riser member 38 connected to the first clamp assembly 16 and includes a first outer riser member 40 received on the first inner riser member 38.

The first outer riser member 40 is connected to the first inner riser member 38 in a telescopic manner. The effective length of the first adjustable-length riser portion 18 is adjusted by extending the first outer riser member 40 with respect to the first inner riser member 38. The first outer riser member 40 is fitted to the first inner riser member 38 by a friction fit.

The second adjustable-length riser portion 24 includes a second inner riser member 44 that is connected to the second clamp assembly 22 and includes a second outer riser member 46 received on the second inner riser member 44. The second outer riser member 46 is connected to the second inner riser member 44 in a telescopic manner. The effective length of the second adjustable-length riser portion 24 is adjusted by extending the second outer riser member 46 with respect to the second inner riser member 44. The second outer riser member 46 is fitted to the second inner riser member 44 by a friction fit.

The first outer riser member 40 includes first length measurement indicia 42, and the second outer riser member 46 includes second length measurement indicia 48.

Preferably, a first illumination assembly is housed in the motor-vehicle-mounted trailer alignment unit 12. The first illumination assembly includes a first set of batteries 28. A first set of wiring 30 is electrically connected to the first set of batteries 28, and a first set of illumination devices 32 is electrically connected to the first set of wiring 30. The first set of illumination devices 32 can be battery-powered lamps or LED's.

Also, preferably, a second illumination assembly is housed in the trailer-mounted motor vehicle alignment unit 14. The second illumination assembly includes a second set of batteries 34. A second set of wiring is electrically connected to the second set of batteries 34, and a second illumination device 26 is electrically connected to the second set of wiring. The second illumination device 26 can be a battery-powered lamp or LED.

To use the vehicle and trailer mounted hitch alignment apparatus 10 of the invention, as shown in FIG. 1, the motor-vehicle-mounted trailer alignment unit 12 is installed on the motor vehicle 11, and the trailer-mounted motor vehicle alignment unit 14 is installed on the trailer 13.

More specifically with respect to the motor-vehicle-mounted trailer alignment unit 12, the first clamp assembly 16 is clamped onto the ball support strut 19 which supports the vehicle-mounted trailer ball 15. The clamping of the motor-vehicle-mounted trailer alignment unit 12 to the ball support strut 19 is accomplished by placing the C-shaped fixed clamping member 50 of the first clamp assembly 16 around the ball support strut 19 and tightening the movable clamping screw assembly 52. The motor-vehicle-mounted trailer alignment unit 12 is oriented in a vertical orientation.

More specifically with respect to the trailer-mounted motor vehicle 20 alignment unit 14, the second clamp assembly 22 is clamped onto a trailer-mounted support strut 21 for the trailer-mounted ball receiver 17. The clamping Also, preferably, a second illumination assembly is housed in the trailer-mounted motor vehicle alignment unit 14. The second illumination assembly includes a second set of batteries 34. A second set of wiring is electrically connected to the second set of batteries 34, and a second illumination device 26 is electrically connected to the second set of wiring. The second illumination device 26 can be a battery-powered lamp or LED.

To use the vehicle and trailer mounted hitch alignment apparatus 10 of the invention, as shown in FIG. 1, the motor-vehicle-mounted trailer alignment unit 12 is installed on the motor vehicle 11, and the trailer-mounted motor vehicle alignment unit 14 is installed on the trailer 13.

More specifically with respect to the motor-vehicle-mounted trailer alignment unit 12, the first clamp assembly 16 is clamped onto the ball support strut 19 which supports the vehicle-mounted trailer ball 15. The clamping of the motor-vehicle-mounted trailer alignment unit 12 to the ball support strut 19 is accomplished by placing the C-shaped fixed clamping member 50 of the first clamp assembly 16 around the ball support strut 19 and tightening the movable clamping screw assembly 52. The motor-vehicle-mounted trailer alignment unit 12 is oriented in a vertical orientation.

More specifically with respect to the trailer-mounted motor vehicle alignment unit 14, the second clamp assembly 22 is clamped onto a trailer-mounted support strut 21 for the trailer-mounted ball receiver 17. The clamping of the trailer-mounted motor vehicle alignment unit 14 to the trailer-mounted support strut 21 is accomplished by placing the C-shaped fixed clamping member 50 of the second clamp assembly 22 around the trailer-mounted support strut 21 and tightening the movable clamping screw assembly 52. The trailer-mounted motor vehicle alignment unit 14 is oriented in a vertical orientation.

The effective length of the first adjustable-length riser portion 18 is adjusted by moving the first outer riser member 40 longitudinally with respect to the first inner riser member 38, and the effective length of the second adjustable-length riser portion 24 is adjusted by moving the second outer riser member 46 longitudinally with respect to the second inner riser member 44. The respective effective lengths of the motor-vehicle-mounted trailer alignment unit 12 and the trailer-mounted motor vehicle alignment unit 14 are adjusted so that the driver of the motor vehicle 11 can see the first alignment member 20 and the second alignment member 26 when the driver looks through the rear window of the motor vehicle 11.

Moreover, the rotational position of the first alignment member 20 is adjusted around the first swivel connection 54 so that the second alignment member 26 of being positioned in a central location between the two alignment branches of the U-shaped first alignment member 20 when the trailer-mounted ball receiver 17 is in proper registration with the vehicle-mounted trailer ball 15.

The respective lengths of the motor-vehicle-mounted trailer alignment unit 12 and the trailer-mounted motor vehicle alignment unit 14 and the swivel-adjusted orientation of the motor-vehicle-mounted trailer alignment unit 12 can be calibrated when the trailer-mounted ball receiver 17 of the trailer 13 is disconnected from the vehicle-mounted trailer ball 15 and is raised by a suitable clearance distance above the vehicle-mounted trailer ball 15, as shown in FIG. 1. The trailer jack 58 is used to raise the trailer-mounted ball receiver 17 the suitable clearance distance above the vehicle-mounted trailer ball 15 when the trailer-mounted ball receiver 17 is disconnected from the vehicle-mounted trailer ball 15.

During poor ambient light conditions, such as at night, the first set of illumination devices 32 on the first alignment member 20 can be lit, and the second illumination device 26 in the second alignment member 26 can be lit also. When the second alignment member 26 is illuminated, the second alignment member 26 serves as the second illumination device 26. Then, when the motor vehicle 11 is aligned with the trailer 13, the alignment process is carried out so that the second illumination device 26 becomes centrally located between the two first illumination devices 32.

The components of the vehicle and trailer mounted hitch alignment apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle and trailer mounted hitch alignment apparatus that is low in cost, relatively simple in design and operation, and which may advantageously be used to assure proper alignment without depending upon observation of a vibrating element. With the invention, a vehicle and trailer mounted hitch alignment apparatus is provided which does not require magnet-based attachment means. With the invention, a vehicle and trailer mounted hitch alignment apparatus is provided which does not require a pivoting alignment unit. With the invention, a vehicle and trailer mounted hitch alignment apparatus is provided which does not require an alignment element to be fitted onto a vehicle-mounted trailer ball.

Also, with the invention, a vehicle and trailer mounted hitch alignment apparatus is provided which does not require an electrically powered source of illumination. With the invention, a vehicle and trailer mounted hitch alignment apparatus is provided which has a first alignment device which can be removably clamped onto the vehicle and has a second alignment device which can be removably clamped onto the trailer. With the invention, a vehicle and trailer mounted hitch alignment apparatus is provided which has alignment elements whose vertical heights can be adjusted. With the invention, a vehicle and trailer mounted hitch alignment apparatus provides that the proper alignment of a first source of illumination and a second source of illumination is indicative of the proper alignment of the vehicle and the trailer.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A hitch alignment apparatus for mounting on a motor vehicle and a trailer, comprising:
   a motor-vehicle-mounted trailer alignment unit for attachment to a rear portion of the motor vehicle, wherein said motor-vehicle-mounted trailer alignment unit includes a first clamp assembly for clamping onto the rear portion of the motor vehicle, a first adjustable-length riser portion connected to said first clamp assembly, and a first alignment member connected to the top of said first adjustable-length riser portion, and
   a trailer-mounted motor vehicle alignment unit for attachment to a front portion of the trailer, wherein said motor-vehicle-mounted trailer alignment unit includes a second clamp assembly for clamping onto the front portion of the trailer, a second adjustable-length riser portion connected to said second clamp assembly, and a second alignment member connected to the top of said second adjustable-length riser portion,
   wherein said first adjustable-length riser portion includes a first inner riser member connected to said first clamp assembly and includes a first outer riser member received on said first inner riser member, and
   wherein said first outer riser member includes first length measurement indicia, and
   said second outer riser member includes second length measurement indicia.

2. The apparatus of claim 1, further including:
   a first swivel connection connected between said first adjustable-length riser portion and said first clamp assembly.

3. The apparatus of claim 1, further including:
   a second swivel connection connected between said second adjustable-length riser portion and said second clamp assembly.

4. The apparatus of claim 1 wherein each of said first clamp assembly and said second clamp assembly includes a C-shaped fixed clamping member connected to a respective adjustable-length riser portion and a movable clamping screw assembly connected to said C-shaped fixed clamping member.

5. The apparatus of claim 1 wherein:
   said first alignment member is formed as a U-shaped alignment member having two alignment branches, and
   said second alignment member is formed as a single alignment member which is placed in registration between said alignment branches.

6. The apparatus of claim 1 wherein said first outer riser member is connected to said first inner riser member in a telescopic manner.

7. The apparatus of claim 1 wherein the effective length of said first adjustable-length riser portion is adjusted by extending said first outer riser member with respect to said first inner riser member.

8. The apparatus of claim 1 wherein said first outer riser member is fitted to said first inner riser member by a friction fit.

9. A hitch alignment apparatus for mounting on a motor vehicle and a trailer, comprising:
   a motor-vehicle-mounted trailer alignment unit for attachment to a rear portion of the motor vehicle, wherein said motor-vehicle-mounted trailer alignment unit includes a first clamp assembly for clamping onto the rear portion of the motor vehicle, a first adjustable-length riser portion connected to said first clamp assembly, and a first alignment member connected to the top of said first adjustable-length riser portion, and
   a trailer-mounted motor vehicle alignment unit for attachment to a front portion of the trailer, wherein said motor-vehicle-mounted trailer alignment unit includes a second clamp assembly for clamping onto the front portion of the trailer, a second adjustable-length riser portion connected to said second clamp assembly, and a second alignment member connected to the top of said second adjustable-length riser portion
   wherein said second adjustable-length riser portion includes a second inner riser member connected to said second clamp assembly and includes a second outer riser member received on said second inner riser member, and wherein the effective length of said second adjustable-length riser portion is adjusted by extending said second outer riser member with respect to said second inner riser member.

10. The apparatus of claim 9 wherein said second outer riser member is connected to said second inner riser member in a telescopic manner.

11. The apparatus of claim 9 wherein said second outer riser member is fitted to said second inner riser member by a friction fit.

12. The apparatus of claim 1, further including:
a first illumination assembly housed in said motor-vehicle-mounted trailer alignment unit, wherein said first illumination assembly includes a first set of batteries, a first set of wiring electrically connected to said first set of batteries, and a first set of illumination devices electrically connected to said first set of wiring, and a second illumination assembly housed in said trailer-mounted motor vehicle alignment unit, wherein said second illumination assembly includes a second set of batteries, a second set of wiring electrically connected to said second set of batteries, and a second illumination device electrically connected to said second set of wiring.

* * * * *